United States Patent
Füchtner

(10) Patent No.: US 9,096,143 B2
(45) Date of Patent: Aug. 4, 2015

(54) TEMPERATURE CONTROL SYSTEM FOR A DRIVE DEVICE OF A MOTOR VEHICLE, METHOD FOR OPERATING SUCH A TEMPERATURE CONTROL SYSTEM AND MOTOR VEHICLE HAVING SUCH A TEMPERATURE CONTROL SYSTEM

(75) Inventor: Martin Füchtner, Stuttgart (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 860 days.

(21) Appl. No.: 13/277,555

(22) Filed: Oct. 20, 2011

(65) Prior Publication Data

US 2012/0104843 A1    May 3, 2012

(30) Foreign Application Priority Data

Oct. 28, 2010 (DE) .......................... 10 2010 060 230

(51) Int. Cl.
*G01K 1/14* (2006.01)
*G01K 13/02* (2006.01)
(Continued)

(52) U.S. Cl.
CPC ........ *B60L 11/1874* (2013.01); *B60H 1/00278* (2013.01); *B60K 11/02* (2013.01); *B60L 1/003* (2013.01); *B60L 1/02* (2013.01); *B60L 11/14* (2013.01); *B60L 11/1875* (2013.01); *H01M 10/625* (2015.04); *H01M 10/663* (2015.04); *H01M 10/667* (2015.04); *B60H 2001/00307* (2013.01); *B60K 2001/005* (2013.01); *B60K 2001/006* (2013.01); *B60L 2210/40* (2013.01); *B60L 2240/36* (2013.01); *B60L 2240/425* (2013.01); *B60L 2240/525* (2013.01); *B60L 2240/545* (2013.01); *B60L 2260/14* (2013.01);
(Continued)

(58) Field of Classification Search
USPC .................. 374/144, 145, 152, 165; 236/1 C
See application file for complete search history.

(56) References Cited

U.S. PATENT DOCUMENTS 4,841,734 A * 6/1989 Torrence ......................... 62/115
5,526,871 A * 6/1996 Musser et al. ................ 165/11.1
(Continued)

FOREIGN PATENT DOCUMENTS

| DE | 60122992 T2 | 3/2007 |
|----|-------------|--------|
| JP | 11-200858 | 7/1999 |
| KR | 100388825 B1 | 6/2003 |

OTHER PUBLICATIONS

Translation of DE 60122992 (Mar. 15, 2007).*
(Continued)

*Primary Examiner* — Mirellys Jagan
(74) *Attorney, Agent, or Firm* — RatnerPrestia

(57) ABSTRACT

A temperature control system for a drive device of a motor vehicle includes a first temperature control circuit, which is coupled to an electric drive apparatus of the drive device; a second temperature control circuit, which is separate from the first temperature control circuit and is coupled to an electric energy store of the drive device; and a heat exchanger for optionally transferring heat between the first temperature control circuit and the second temperature control circuit. A method for operating a temperature control system for a drive device of a motor vehicle includes optional transmission of heat between the first temperature control circuit and the second temperature control circuit by way of a heat exchanger in such a way that heat is extracted from the first temperature control circuit and the second temperature control circuit.

17 Claims, 1 Drawing Sheet

(51) Int. Cl.
*G01K 7/00* (2006.01)
*B60L 11/18* (2006.01)
*B60H 1/00* (2006.01)
*B60K 11/02* (2006.01)
*B60L 1/00* (2006.01)
*B60L 1/02* (2006.01)
*B60L 11/14* (2006.01)
*H01M 10/625* (2014.01)
*H01M 10/663* (2014.01)
*H01M 10/667* (2014.01)
*B60K 1/00* (2006.01)

(52) U.S. Cl.
CPC ...... *B60L 2260/162* (2013.01); *B60L 2260/165* (2013.01); *B60L 2260/167* (2013.01); *B60L 2260/56* (2013.01); *B60L 2260/58* (2013.01); *H01M 2220/20* (2013.01); *Y02T 10/642* (2013.01); *Y02T 10/70* (2013.01); *Y02T 10/7005* (2013.01); *Y02T 10/705* (2013.01); *Y02T 10/7077* (2013.01); *Y02T 10/7241* (2013.01)

(56) References Cited

U.S. PATENT DOCUMENTS

| | | | |
|---|---|---|---|
| 5,878,589 A * | 3/1999 | Tanaka et al. | 62/199 |
| 6,450,275 B1 | 9/2002 | Gabriel | |
| 8,191,662 B2 * | 6/2012 | Sauvlet et al. | 180/65.27 |
| 8,215,432 B2 * | 7/2012 | Nemesh et al. | 180/68.2 |
| 8,494,689 B1 * | 7/2013 | Ashton | 701/3 |
| 8,527,095 B2 * | 9/2013 | Kikuchi et al. | 700/275 |
| 8,534,402 B2 * | 9/2013 | Seccardini et al. | 180/68.4 |
| 8,555,826 B2 * | 10/2013 | Feldhaus et al. | 123/41.8 |
| 8,919,471 B2 * | 12/2014 | Oberti et al. | 180/68.4 |
| 9,022,647 B2 * | 5/2015 | Jentz et al. | 374/145 |
| 2003/0139894 A1 * | 7/2003 | Ryan et al. | 702/132 |
| 2003/0154735 A1 * | 8/2003 | Wurth | 62/259.2 |
| 2004/0069768 A1 * | 4/2004 | Patterson et al. | 219/492 |
| 2004/0154573 A1 * | 8/2004 | Reutlinger | 123/142.5 R |
| 2005/0055141 A1 * | 3/2005 | Suzuki et al. | 701/22 |
| 2008/0251303 A1 * | 10/2008 | Rouaud et al. | 180/65.2 |
| 2010/0087979 A1 * | 4/2010 | Neusinger et al. | 701/22 |
| 2010/0087989 A1 * | 4/2010 | Yamanaka et al. | 701/41 |
| 2011/0206951 A1 * | 8/2011 | Ford et al. | 429/50 |
| 2011/0214838 A1 * | 9/2011 | Akiyama et al. | 165/41 |
| 2011/0298427 A1 * | 12/2011 | Uemura et al. | 320/134 |
| 2012/0041628 A1 * | 2/2012 | Hermann et al. | 701/22 |
| 2012/0123626 A1 * | 5/2012 | Takahashi et al. | 701/22 |
| 2012/0183815 A1 * | 7/2012 | Johnston et al. | 429/50 |

OTHER PUBLICATIONS

Translation of Korean Notice of Preliminary Objection, dated Feb. 5, 2013, corresponding to Korean Patent Application No. 10-2011-110279.

* cited by examiner

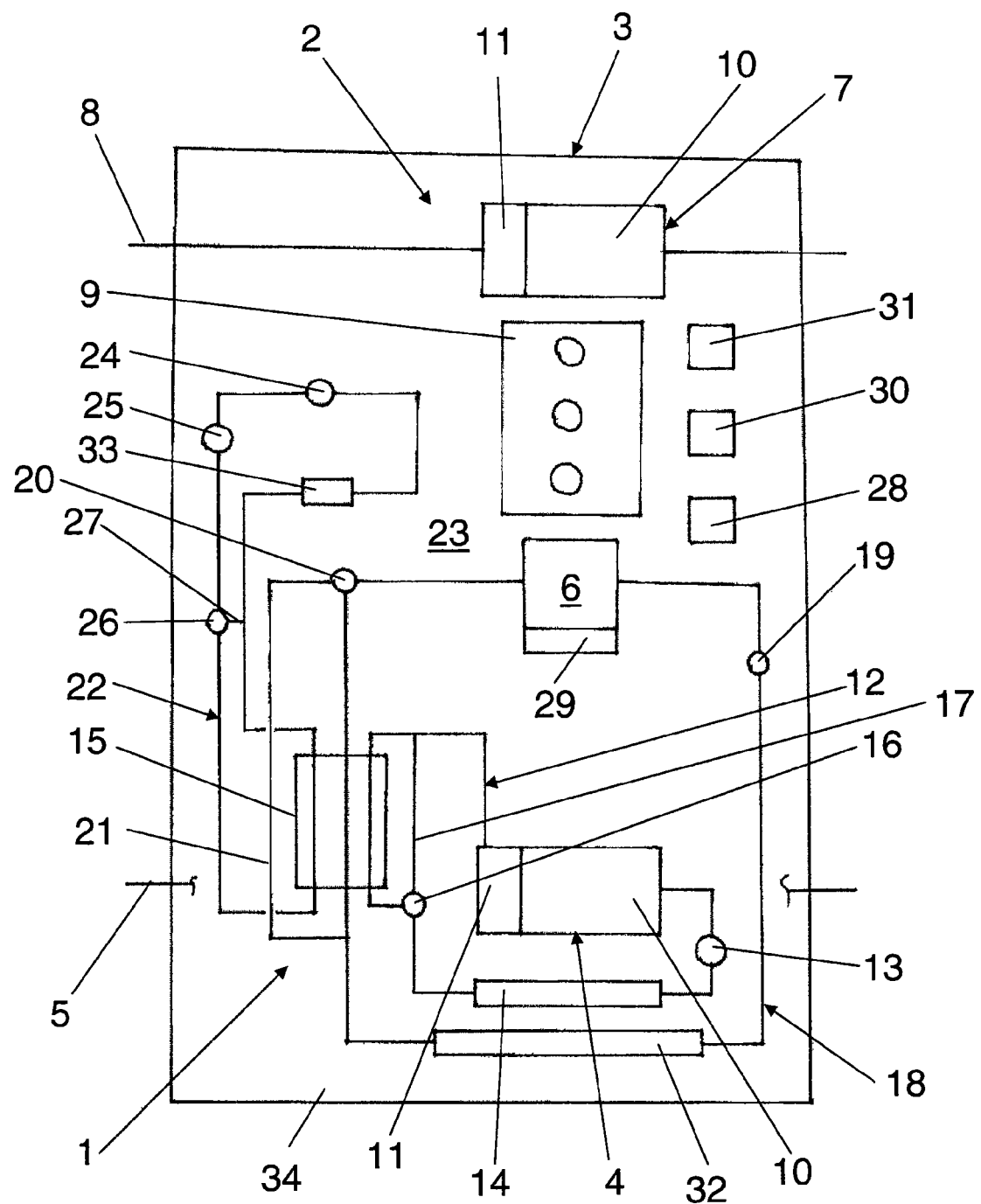

TEMPERATURE CONTROL SYSTEM FOR A DRIVE DEVICE OF A MOTOR VEHICLE, METHOD FOR OPERATING SUCH A TEMPERATURE CONTROL SYSTEM AND MOTOR VEHICLE HAVING SUCH A TEMPERATURE CONTROL SYSTEM

CROSS-REFERENCE TO RELATED APPLICATION

This U.S. patent application claims priority to German Patent Application DE 102010060230.2, filed Oct. 28, 2010, which is incorporated by reference herein in its entirety.

FIELD OF THE INVENTION

The present invention relates to a temperature control system for a motor vehicle, a method for operating such a temperature control system and to a motor vehicle having such a temperature control system.

BACKGROUND OF THE INVENTION

Although the present invention can be applied to any vehicles, said invention and the problems on which it is based are explained in more detail with respect to a passenger motor vehicle.

In hybrid vehicles and/or electric vehicles, the power which can be output by an electric drive apparatus and an electric energy store which is assigned to the electric drive apparatus depends to a great extent on the temperature of these components. The electric drive apparatus delivers power best at a temperature which is as low as possible, and the electric energy store preferably delivers power best at a temperature of approximately 37° C. For the electric drive apparatus and the electric energy store to deliver power in an optimum way, it is necessary to control the temperature of these components.

DE 601 22 992 D2, which is incorporated by reference herein, describes a cooling apparatus for a hybrid vehicle comprising a thermal engine and at least one electric motor. The cooling apparatus comprises a cooling means for cooling the thermal engine and the electric motor, a cooler with a plurality of cooling ducts for cooling the coolant through heat exchange with an airstream, a first line between the cooler and the thermal engine in the direction of flow of the coolant and a second line between the thermal engine and the cooler in the direction of flow of the coolant. In addition, the cooling apparatus has a branch line which comprises a first branch, connected to the first line, and a second branch, connected to a line upstream of the thermal engine, wherein the branch line is suitable for cooling the electric motor, and wherein the first branch is routed via an electronic power unit and the electric motor.

U.S. Pat. No. 6,450,275 B1, which is incorporated by reference herein, describes a method and a device for cooling components of a hybrid vehicle. The device serves to cool electric hybrid components such as, for example, an alternating current system, an internal combustion engine, an electric drive unit with the associated assemblies such as, for example, a DC/DC converter, a generator and a drive motor. These components are cooled by means of a cooling system which has cooling circuits, coolers, fans, pumps, an air conditioning system compressor and a control apparatus. The pumps move the fluid through the cooling circuits, wherein the fluid takes up heat from the components, which heat is discharged by means of the coolers with the participation of the airstream of the fan. The control apparatus controls the temperature of the components by measuring the current component temperature or the corresponding coolant temperature and comparing it with a measured value of a sensor in order to switch on the fan if necessary. By monitoring the fan speed, the control apparatus regulates the airstream passing via the cooler and the air capacitor in order to keep the coolant temperature and therefore the temperature of the components within predetermined limits.

SUMMARY OF THE INVENTION

The present invention provides an improved temperature control system.

Disclosed herein is a temperature control system for a drive device of a motor vehicle is provided, comprising: a first temperature control circuit, which is coupled to an electric drive apparatus of the drive device; a second temperature control circuit, which is separate from the first temperature control circuit and is coupled to an electric energy store of the drive device; and a heat exchanger for optionally transferring heat between the first temperature control circuit and the second temperature control circuit.

In addition, also disclosed herein is a method for operating a temperature control system for a drive device of a motor vehicle is provided, wherein the temperature control system has a first temperature control circuit, which is coupled to an electric drive apparatus, and a second temperature control circuit, which is separate from the first temperature control circuit and is coupled to an electric energy store, having the following method step: optional transmission of heat between the first temperature control circuit and the second temperature control circuit by means of a heat exchanger in such a way that heat is extracted from the first temperature control circuit or the second temperature control circuit.

This makes it possible to transfer heat from the first temperature control circuit to the second temperature control circuit and vice versa in order to cool the electric drive apparatus and/or adjust the electric energy store to an optimum operating temperature as required.

According to one preferred development, the temperature control system has a third temperature control circuit for controlling the temperature of a passenger compartment of the motor vehicle, wherein the heat exchanger is designed to optionally transfer heat between the first temperature control circuit and the second temperature control circuit, the first temperature control circuit and the third temperature control circuit, the second temperature control circuit and the third temperature control circuit and/or the first temperature control circuit, the second temperature control circuit and the third temperature control circuit. As a result, heat can be extracted both from the first temperature control circuit and from the second temperature control circuit by means of the third temperature control circuit, as a result of which these temperature control circuits can be cooled down further. This expands the field of application of the temperature control system.

According to one preferred exemplary embodiment, the third temperature control circuit has an electric air conditioning compressor. As a result, the third temperature control circuit can be cooled as desired by means of the electric air conditioning compressor.

According to one preferred embodiment, the temperature control circuits each have switching valves for switchably feeding a temperature control fluid to the heat exchanger.

As a result, the optional transfer of heat between the temperature control circuits is embodied in such a way that it can be switched with technical simple means.

According to one preferred development, the temperature control system has a control apparatus for actuating the switching valves, which permits automated and comfortable actuation of the switching valves. This simplifies the use of the temperature control system.

According to a further preferred development, the electric drive apparatus has an electric machine, which is coupled to the first temperature control circuit, and a power electronic system, in particular a pulse controlled inverter, which is coupled to the first temperature control circuit. As a result, both the temperature of the electric machine and that of the power electronic system assigned thereto can be advantageously controlled. This increases the electric power which can be extracted from the drive apparatus.

According to one preferred embodiment, the temperature control system has a heating apparatus, in particular an electric heating apparatus, for heating the electric energy store. As a result, the electric energy store can be heated quickly and to an optimum operating temperature independent of the first and second temperature control circuits.

According to a further preferred embodiment, the first temperature control circuit and/or the second temperature control circuit each have a cooler, in particular an air cooler. As a result the heat which is carried away from the electric energy store and the electric drive apparatus can be discharged into the surroundings of the motor vehicle.

According to one preferred development, the electric energy store is embodied as a high voltage battery. This permits loss-reduced transfer of the electric energy from the electric energy store to the electric drive apparatus.

According to one preferred embodiment, in a further method step, heat is extracted from the first temperature control circuit and/or the second temperature control circuit by means of a third temperature control circuit. As a result, heat can be extracted both from the first temperature control circuit and from the second temperature control circuit by means of the third temperature control circuit, as a result of which these temperature control circuits can be advantageously cooled down.

According to a further preferred embodiment, the drive device is prepared for maximum power output by means of the further method step. This makes it possible, for example, to condition the drive device for a race start.

According to one preferred development, during the further method step the electric drive apparatus is cooled down to a minimum possible temperature, and the temperature of the electric energy store is adjusted to a temperature which is optimum for operating the electric energy store. As a result, it is possible for the electric drive apparatus and the electric energy store to deliver power in an optimum way.

According to one preferred embodiment, the further method step is initiated by activating a switching device. As a result, a vehicle driver can initiate the further method step as desired, in order, for example, to permit a race start of a motor vehicle with such a temperature control system.

BRIEF DESCRIPTION OF THE DRAWING FIGURE

The invention is explained in more detail on the basis of exemplary embodiments and with reference to the appended schematic figure of the drawing in the following text.

The appended figure shows, in a plan view, a motor vehicle comprising a temperature control system according to a preferred embodiment of the present invention.

DETAILED DESCRIPTION OF THE DRAWING FIGURE

The figure illustrates a preferred embodiment of a temperature control system 1 for a drive device 2 of a motor vehicle 3. The drive device 2 has, for example, at least one electric drive apparatus 4 for driving a drive axle 5, an electric energy store 6, in particular a battery 6, and a further drive axle 8, which can also be driven by means of a further electric drive apparatus 7. The drive device 2 can optionally have an internal combustion engine 9. One of the drive axles 5, 8 or both drive axles 5, 8 can be driven by means of the internal combustion engine 9. The first and/or the second electric drive apparatuses 4, 7 each preferably have an electric machine 10 and a power electronic system 11, in particular a pulse controlled inverter 11, which is assigned to the electric machine 10. The electric energy store 6 is preferably embodied as a high voltage battery 6. The electric machine 10 is preferably designed for operating both a generator and an electric motor. The electric machine 10 can be operatively connected to the internal combustion engine 9.

The temperature control system 1 has, for example, a first temperature control circuit 12 which is assigned to the electric drive apparatus 4 and/or to the further electric drive apparatus 7 and is coupled thereto. In the text which follows, reference is only made to the first electric drive apparatus 4. The second electric drive apparatus 7 can also be coupled to the first temperature control circuit 12 or have a separate temperature control circuit. In particular, the first temperature control circuit 12 is coupled to the electric machine 10, and to the power electronic system 11. The temperature control fluid, in particular cooling water, preferably flows through the first temperature control circuit 12. The first temperature control circuit 12 is coupled to the electric machine 10 and to the power electronic system 11 in such a way that the latter are cooled or heated by means of the first temperature control circuit 12. A pump apparatus 13, in particular an electric water pump 13, of the first temperature control circuit 12 ensures that the cooling fluid circulates. A cooler 14, in particular an air cooler 14, which is preferably arranged in a front region 34 of the motor vehicle 3, permits heat to be extracted from the first temperature control circuit 12. The cooler 14 is preferably embodied as an air/fluid heat exchanger.

The temperature control system 1 also has a heat exchanger 15, in particular a triple action heat exchanger 15 which is operatively connected in a switchable fashion to the first temperature control circuit 12. By means of a switching valve 16, in particular an electric switching valve 16, of the first temperature control circuit 12, the cooling fluid which circulates in the first temperature control circuit 12 can be passed through the heat exchanger 15 or can be made to pass by the heat exchanger 15 by means of a bypass line 17 given a corresponding switch position of the switching valve 16.

The temperature control system 1 preferably has a second temperature control circuit 18, which is preferably assigned to the electric energy store 6 and is coupled thereto. The second temperature control circuit 18 preferably has a pump apparatus 19, in particular an electric water pump 19, which circulates a cooling fluid in the second temperature control circuit 18. Heat is fed to or extracted from the electric energy store 6 by means of the second temperature control circuit 18. The second temperature control circuit 18 is preferably also operatively connected to the cooler 14, wherein the temperature control circuits 12, 18 in the cooler 14 are preferably fluidically separated from one another. Alternatively, the second temperature control circuit 18 can have a separate cooler 32. The cooler 32 is preferably embodied as an air/fluid heat exchanger. The second temperature control circuit 18 can also be embodied without a cooler. The second temperature control circuit 18 is also optionally operatively connected to the heat exchanger 15, as a result of which heat can be transferred between the temperature control circuits 12, 18. By means of a corresponding switching valve 20, in particular an electric switching valve 20, the temperature control fluid which circulates in the second temperature control circuit 18 can optionally be fed in a switchable fashion through the heat exchanger 15 or made to pass by the latter by means of a corresponding bypass line 21.

The temperature control system preferably has a third temperature control circuit 22 which serves to control the temperature of the passenger compartment 23 of the motor vehicle 3. The third temperature control circuit 22 preferably has an air conditioning compressor 24, in particular an electric air conditioning compressor 24, for extracting heat from the third temperature control circuit 22. In addition, the third temperature control circuit 22 preferably has a pump apparatus 25, in particular an electric water pump 25, and a heat exchanger 33 for exchanging heat between the passenger compartment 23 and the third temperature control circuit 22. The third temperature control circuit 22 is preferably optionally operatively connected to the heat exchanger 15. By means of a switching valve 26, in particular an electric switching valve 26, and a bypass line 27, cooling fluid which circulates in the third temperature control circuit 22 can be fed in a switchable fashion through the heat exchanger 15 or optionally made to pass by the latter. The temperature control circuits 12, 18, 22 are preferably fluidically separated from one another.

The heat exchanger 15 is designed, in particular, to transfer heat between the first temperature control circuit 12 and the second temperature control circuit 18, between the first temperature control circuit 12 and the third temperature control circuit 22, between the second temperature control circuit 18 and the third temperature control circuit 22, and between all the temperature control circuits 12, 18, 22 simultaneously.

The temperature control system 1 also preferably has a control apparatus 28 for actuating the switching valves 16, 20, 26. In addition, the temperature control system 1 has a heating apparatus 29, in particular an electric heating apparatus 29, for heating the electric energy store 6. The temperature control system 1 preferably has a switch 30, which can be operated by a vehicle driver and has the purpose of controlling the temperature control system 1, and a display 31 for displaying a temperature control state of the drive device 2. The method of functioning of the temperature control system 1 is explained below. In a first operating state of the temperature control system 1, heat which can be extracted from the first and second temperature control circuit 12, 18 is maximized by means of the coolers 14, 32 and the heat exchanger 15. That is to say the electric drive apparatus 4 is cooled as far as is possible by means of the cooler 14 and the second temperature control circuit 18, and the temperature of the battery 6 is adjusted to a temperature, for example 37° C., which is optimum for operating the battery 6, by means of the waste heat of the electric drive apparatus 4. The first temperature control circuit 12 and the second temperature control circuit 18 exchange heat by means of the heat exchanger 15 in such a way that the electric drive apparatus 4 and the electric energy store 6 preferably have the lowest possible temperature which can be achieved by means of the cooling capacity of the coolers 14, 32. Depending on which circuit 12, 18 heat is to be discharged from or which circuit 12, 18 fed to, the temperature control circuits 12, 18 are coupled to one another or decoupled from one another by means of the heat exchanger 15. If necessary, the battery 6 can be cooled by means of the cooler 32 or heated by means of the waste heat of the electric drive apparatus 4. In the first operating state of the temperature control system 1, the switching valve 26 of the third temperature control circuit 22 is preferably switched in such a way that the third temperature control circuit 22 is decoupled from the heat exchanger 15. The third temperature control circuit 22 serves in this operating state merely to control the temperature of the passenger compartment 23 of the motor vehicle 3. A cooling capacity of the air conditioning compressor 24 is used only to air-condition the passenger compartment 23. The temperature of the passenger compartment 23 can be set as desired by the vehicle driver. The switching of the switching valves 16, 20 for the controlled exchange of heat between the temperature control circuits 12, 18 is preferably carried out by the control apparatus 28 without being noticed by the vehicle driver.

By actuation of the switch 30, the temperature control system 1 is switched into a second operating state, referred to as race start conditioning. In the second operating state, the third temperature control circuit 22 is coupled to the heat exchanger 15. It is therefore possible to exchange heat between the third temperature control circuit 22 and the first and/or the second temperature control circuits 12, 18 as well as between the first and second temperature control circuits 12, 18. In the second operating state, the drive device 2 is placed in a state in which it can make available maximum electric power. In the second operating state, the temperature control system 1 is preferably switched when the motor vehicle 3 is connected to a fixed power network. Furthermore, in the case in which the motor vehicle 3 is embodied as a hybrid vehicle and the running internal combustion engine 9 generates electric current by means of a generator operating mode of an electric machine, the temperature control system 1 can be switched into the second operating state, for example in a stationary phase of the motor vehicle 3 at a set of traffic lights. The electric air conditioning compressor 24 is preferably operated by means of the electric energy which is fed from the outside or generated by the internal combustion engine 9.

By means of the air conditioning compressor 24 of the third temperature control circuit 22 and of the heat exchanger 15, the first temperature control circuit 12 is adjusted to a temperature which is as low as possible. In particular to a temperature at the electric machine 10 of approximately 140° and of approximately 70° at the power electronic system 11. The electric machine 10 is preferably not cooled down as far as the power electronic system 11 which is assigned to it, in order to avoid worsening the running properties of a transmission which is operatively connected to the electric machine 10. The second temperature control circuit 18 is preferably adjusted to a temperature of approximately 37° since at this temperature the electric energy store 6 delivers power best. In particular, the battery 6 is adjusted to a temperature which is somewhat below the "comfortable temperature" of the battery 6 of approximately 37° C., since the battery 6 heats up under load. In order to reach the desired temperature of the second temperature control circuit 18, waste heat of the first temperature control circuit 12 is preferably transferred to the second temperature control circuit 18, or the electric energy store 6 is adjusted to the desired temperature by means of the optional heating apparatus 29. If the temperature of the battery 6 is too high, heat is extracted from the second temperature control circuit 18 by means of the cooler 32 and/or by means of the third temperature control circuit 22. The electric drive apparatus 4 can be overloaded for a certain period of time after cooling down to a correspondingly low temperature, and can therefore make available significantly more driving power than in a warm state.

The display 31 displays to the vehicle driver in particular the period of time for which the electric drive apparatus 4 and the battery 6 can be operated at maximum electric power, that is to say under overloading. This period depends on how low the temperature is, that is to say the cooling down in the first temperature control circuit 12. The lower the temperature in the first temperature control circuit 12, the longer the period of time for which an overload operating mode of the electric drive apparatus 4 is possible. The vehicle driver can therefore decide whether the currently possible duration of the overload operating mode is sufficient or whether he would like to perform further cooling down. After the cooling down of the electric drive apparatus 4, it can be selectively overloaded and therefore has a higher power output than in a warm operating state.

The invention claimed is:

1. A temperature control system for a drive device of a motor vehicle, comprising:
   a first temperature control circuit, which is coupled to an electric drive apparatus of the drive device;
   a second temperature control circuit, which is separate from the first temperature control circuit and is coupled to an electric energy store of the drive device; and
   a heat exchanger for selectively transferring heat between the first temperature control circuit and the second temperature control circuit,
   wherein the first and second temperature control circuits each have switching valves for selectively bypassing a temperature control fluid around the heat exchanger.

2. The temperature control system as claimed in claim 1, wherein the temperature control system has a control apparatus for actuating the switching valves.

3. The temperature control system as claimed in claim 1, wherein the electric energy store is embodied as a high voltage battery.

4. The temperature control system as claimed in claim 1 further comprising a third temperature control circuit for controlling the temperature of a passenger compartment of the motor vehicle,
   wherein the heat exchanger is configured to selectively transfer heat between: (a) the first temperature control circuit and the second temperature control circuit, (b) the first temperature control circuit and the third temperature control circuit, (c) the second temperature control circuit and the third temperature control circuit, and/or (d) the first temperature control circuit, the second temperature control circuit and the third temperature control circuit.

5. The temperature control system as claimed in claim 4, wherein the third temperature control circuit has an electric air conditioning compressor.

6. The temperature control system as claimed in claim 1, wherein the electric drive apparatus has an electric machine coupled to the first temperature control circuit, and a power electronic system coupled to the first temperature control circuit.

7. The temperature control system as claimed in claim 6, wherein the power electronic system is a pulse controlled inverter.

8. The temperature control system as claimed in claim 1, wherein the temperature control system has a heating apparatus for heating the electric energy store.

9. The temperature control system as claimed in claim 8, wherein the heating apparatus is an electric heating apparatus.

10. The temperature control system as claimed in claim 1, wherein the first temperature control circuit and/or the second temperature control circuit each have a cooler.

11. The temperature control system as claimed in claim 10, wherein the cooler is an air cooler.

12. A motor vehicle having a temperature control system as claimed in claim 1.

13. A method for operating a temperature control system for a drive device of a motor vehicle, wherein the temperature control system has a first temperature control circuit, which is coupled to an electric drive apparatus, and a second temperature control circuit, which is separate from the first temperature control circuit and is coupled to an electric energy store, having the following method step:
   transmission of heat between the first temperature control circuit and the second temperature control circuit by means of a heat exchanger in such a way that heat is extracted from the first temperature control circuit or the second temperature control circuit;
   operating a switching valve in the first temperature control circuit to deliver temperature control fluid either into or around the heat exchanger; and
   operating another switching valve in the second temperature control circuit to deliver temperature control fluid either into or around the heat exchanger.

14. The method as claimed in claim 13 further comprising the step of:
   extracting heat from the first temperature control circuit and/or the second temperature control circuit by means of a third temperature control circuit.

15. The method as claimed in claim 14, wherein the drive device is prepared for maximum power output by means of the extracting step.

16. The method according to claim 14, wherein during the extracting step, the electric drive apparatus is cooled down to a minimum possible temperature, and the temperature of the electric energy store is adjusted to a temperature which is optimum for operating the electric energy store.

17. The method as claimed in claim 14, wherein the extracting step is initiated by activating a switching device.

* * * * *